(12) United States Patent
Mahadev et al.

(10) Patent No.: US 7,836,579 B2
(45) Date of Patent: Nov. 23, 2010

(54) METHOD TO PROTECT A GMR HEAD FROM ELECTROSTATIC DAMAGE DURING THE MANUFACTURING PROCESS

(75) Inventors: Niraj Mahadev, Milpitas, CA (US); Kazumasa Yasuda, Sunnyvale, CA (US); Rudy Ayala, San Jose, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 433 days.

(21) Appl. No.: 11/982,762

(22) Filed: Nov. 5, 2007

(65) Prior Publication Data

US 2008/0066294 A1 Mar. 20, 2008

Related U.S. Application Data

(62) Division of application No. 10/853,461, filed on May 25, 2004, now Pat. No. 7,296,336.

(51) Int. Cl.
*G11B 5/29* (2006.01)
*H05K 3/32* (2006.01)

(52) U.S. Cl. .................. 29/603.12; 29/603.16; 29/840; 29/841; 29/843; 228/120; 228/121

(58) Field of Classification Search .............. 29/603.12, 29/603.04, 603.06, 603.08, 841, 840, 842, 29/843, 860, 603.16; 228/120, 121, 179.1; 360/322, 234.5, 245.8, 245.9, 323
See application file for complete search history.

(56) References Cited

U.S. PATENT DOCUMENTS

| | | | |
|---|---|---|---|
| 5,021,907 A | 6/1991 | Zak | |
| 5,465,186 A | 11/1995 | Bajorek et al. | |
| 5,491,605 A | 2/1996 | Hughbanks et al. | |
| 5,699,212 A | 12/1997 | Erpelding et al. | |
| 6,034,851 A | 3/2000 | Zarouri et al. | |
| 6,202,289 B1* | 3/2001 | Yoshimura et al. | 29/603.12 |
| 6,631,052 B1 | 10/2003 | Girard et al. | |
| 6,643,106 B2 | 11/2003 | Bougtaghou et al. | |
| 6,704,173 B1 | 3/2004 | Lam et al. | |
| 6,757,135 B2* | 6/2004 | Rancour et al. | 360/234.5 X |
| 7,038,144 B2* | 5/2006 | Yasuda et al. | 29/840 X |

FOREIGN PATENT DOCUMENTS

JP 58133616 A * 8/1983

* cited by examiner

*Primary Examiner*—A. Dexter Tugbang
(74) *Attorney, Agent, or Firm*—Saile Ackerman LLC; Stephen B. Ackerman

(57) ABSTRACT

A simple method is provided for protecting slider mounted read/write transducers from electrostatic discharge damage during the manufacture of disk drives. The method involves placing a ball of conducting thermoplastic resin, such as a gold or silver epoxy, between the terminal pads of the transducer and using the ball to shunt the pads to read-head shields and the slider substrate and thence to ground. The epoxy ball is easily applied and easily removed and can be used at different stages in the manufacturing process.

8 Claims, 2 Drawing Sheets

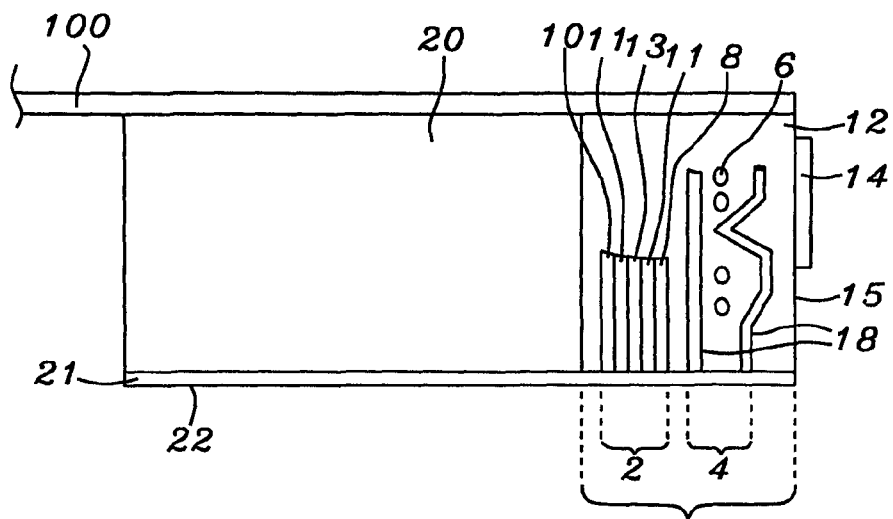
FIG. 1 – Prior Art
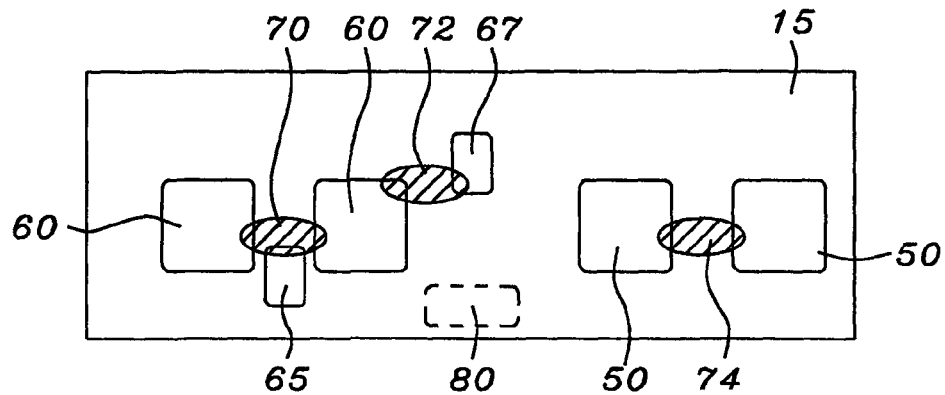
FIG. 2a
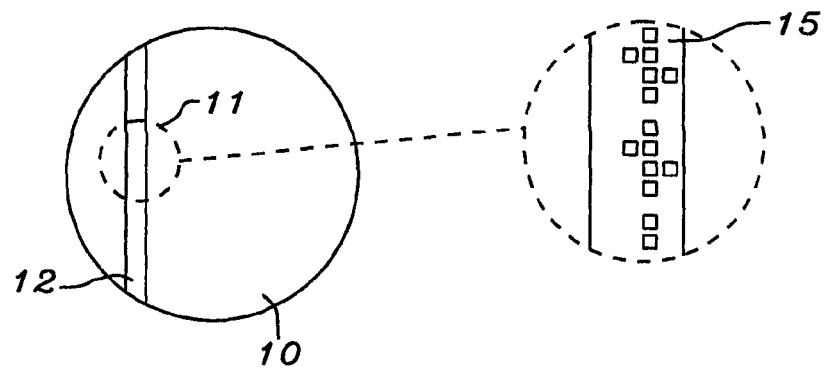
FIG. 2b

METHOD TO PROTECT A GMR HEAD FROM ELECTROSTATIC DAMAGE DURING THE MANUFACTURING PROCESS

This is a Divisional Application of U.S. patent application Ser. No. 10/853,461, filed on May 25, 2004, which has now issued as U.S. Pat. No. 7,296,336 and is herein incorporated by reference in its entirety and assigned to a common assignee.

BACKGROUND OF THE INVENTION

1. Field of the Invention

This invention relates generally to the fabrication of magnetic read and write-heads and more particularly to a method of manufacture that eliminates or significantly reduces the occurrence of electrostatic discharge damage to a GMR read-head during the fabrication process.

2. Description of the Related Art

A magnetic data recording hard disk drive employs a plurality of slider-mounted electromagnetic transducers, a typical one of the prior art being schematically shown in FIG. 1. In a state-of-the-art disk drive, each transducer (1), which is formed on a slider substrate (20) (typically formed of AlTiC) further includes of a read-head (2) and a write-head (4). The combined read head, write head and an additional encapsulating and overcoating layer (12), which are together called the slider-mounted transducer, are produced in great quantities of identical units on a substantially circular wafer (see FIG. 2b). The wafer is then sliced into rows (called row-bars) along chords of the circular wafer and subsequently processed and formed into more complicated assemblies as will be discussed below.

The read-head (2) is typically a multi-layered sensor whose operation is based on the giant magnetoresistive (GMR) effect and, because of the extreme thinness of its magnetic layers, it is extremely sensitive to electrostatic discharge (ESD). The write-head is typically an inductive coil (coil cross-sections shown as (6)) wrapped around a magnetic core (18), which is fairly immune to ESD. The read-head is typically protected from stray electromagnetic fields during disk drive operation by an upper shield (8) and an under-shield (10). A dielectric layer (11), typically alumina, insulates the under-shield from the GMR sensor (13) and an identical layer (also shown as (11)) also insulates the GMR element from the upper shield (8). The shields, dielectric layers, GMR read-head and encapsulating/protective overcoats are sequentially formed on a substrate (20), which, when properly cut, will form the slider-mounted transducer (discussed below). The combined read/write-head (transducer) is typically encapsulated in an insulating alumina deposit (12) and conducting leads (not shown) from the GMR element and the write head coils pass through the encapsulation and are connected to conducting pad-shaped terminals (usually gold or similar highly conducting material) (14) on the trailing edge surface (15). The term "trailing" here refers to the position of the edge relative to the direction of disk motion. External circuitry is ultimately connected to these terminals and used to energize the magnetic field of the write head, provide sensing current to the read head and extract a signal from the read-head. Typically (as will be shown in FIG. 2a), there are a set of two terminals for the read head, a set of two terminals for the write head and additional terminals for making connections through the alumina to the substrate (20) and to the shields ((10) and (8)).

The write head's coil-wrapped (6) magnetic core (18) and the read head's GMR sensor element (13), surrounded by insulating layers (11) and upper (8) and lower (10) shields, emerge at the surface of the encapsulating alumina deposit (12). This surface is co-planar with the surface of the slider (22) and is called the air-bearing surface (ABS) because it literally flies over the surface of a disk suspended on a layer of air (or other gases). The surface of the slider and transducer portion is commonly protected by a highly wear-resistant carbon overcoat (21), which is lapped to provide a smooth surface. Each slider and its mounted transducer is mounted on a stainless steel suspension (100), the combination forming what is called a head-gimbals assembly (HGA).

During its operation, as noted above, the slider surface literally flies over the surface of a rapidly rotating disk. The rapidly rotating disk is prone to accumulate static charges which, in turn, can discharge to the slider and damage the sensor within it. Numerous workers in the field have attempted to address the problem of static discharge during sensor operation. The present invention, however, is concerned with protecting the sensor from the hazards of electrostatic discharge during the many manufacturing processes leading up to the fabrication of the head-gimbals assembly.

There are many steps during the assembly process where static charges may build up to sufficiently significant levels that discharge becomes a problem. At the wafer fabrication level, there are a host of vacuum processes, including ion-beam depositions, plasma etches, etc., where charges can build up on exposed surfaces. The wafer must be sliced to create individual transducers and sliders, which also creates static charges. The ABS of the slider must be lapped, also creating static charge accumulations.

Bajorek et al. (U.S. Pat. No. 5,465,186) teaches a method for shunting discharge current away from the read head by soldering the GMR sensor lead terminals together at the slider surface, thereby diverting transient currents during discharge events.

Hughbanks et al. (U.S. Pat. No. 5,491,605) teaches shunting the leads of the read and write head together and connecting them to the slider substrate through a conducting layer, such as tungsten, formed at the ABS.

Erpelding et al. (U.S. Pat. No. 5,699,212) places solder shunts across adjacent leads of the read head.

Girard et al. (U.S. Pat. No. 6,631,052) provides a generalized conductive pathway on which ESD susceptible components are formed. Selected regions of the pathway can then be removed by ablation.

Lam et al. (U.S. Pat. No. 6,704,173) provide a sensor coupled to a suspension assembly through a conducting strip and diode.

Bougtaghou et al. (U.S. Pat. No. 6,643,106) teaches the formation of a shhunt made of solder.

Zak (U.S. Pat. No. 5,021,907) teaches a method of discharging accumulated electrostatic charge from a slider during disk drive operation using a gimbal spring apparatus that positions electrical contacts against the slider.

Zarouri et al. (U.S. Pat. No. 6,034,851) discloses a hinged shorting bar and a test clip that can be made to short pads on a connector to a magnetic transducer.

The inventions cited above all require rather significant modifications of the tools, the processes or the sensors themselves, which can potentially increase costs and render the fabrication process less efficient. For example, the removal of extra shorting leads or solder connections or clips can itself create ESD events or damage a sensor.

The present invention proposes a significant improvement over the methods of the prior art, by the use of an easily applied and easily removed conducting adhesive as a mechanism for shorting the read head leads together.

SUMMARY OF THE INVENTION

The primary object of this invention is to provide a method for suppressing ESD damage to a GMR read-head (or to an associated inductive write-head) due to the generation and discharge of accumulated static charge through said GMR read-head during the construction of the head-disk assembly or its various sub-components.

It is a second object of this invention to provide such a suppression method that does not require modifying tools, processes or the sensor itself.

It is a third object of the present invention to provide such a suppression method that is cost effective and easily integrated within the present methods of read-head, write-head and disk drive assembly manufacture.

The method of achieving the objects of this invention will be shown in detail with reference to an initial step of the process depicted in FIG. 2a. FIG. 2a schematically shows a trailing edge surface of the slider overcoat portion ((14) in FIG. 1) whereon there are two write-head terminal pads (50), two read-head terminal pads (60), a pad providing a connection to sensor shields (65) and a pad providing connection to the substrate below the overcoat (67). Simply summarized, the method of the present invention uses electrically conductive balls of epoxy (70. 72, 74) to shunt (form an electrically conducting path) the read-head connecting pads to each other and to the sensor shields (70), to the slider substrate (72) and to shunt the write-head connecting pads together (74).

The choice of shunting path depends upon the particular configuration of the heads as they are formed on a wafer. The objective, in any case, is to create a temporary conducting path for dissipation of accumulated static charges which does not allow such charges to pass through the read-head (or write-head) and to so without modifying the tools, the processes or the transducer design itself. A conductive thermoplastic resin (such as epoxy containing gold or silver particles) can be easily applied and easily removed without causing any degradation to either the pads or the heads. There are several methods by which the resin can be applied, screen printing being one example, none of which involve appreciable overhead or disruption of the fabrication process. The simplicity of the method also lends itself to use in other portions of the fabrication process where temporary protection of the heads is required.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIG. 1 (Prior Art) is a schematic cross-sectional view of a slider-mounted transducer.

FIG. 2a is a schematic overhead view of the conducting pads on a trailing edge surface of a slider mounted transducer, showing the pads of the read-head shorted to the slider substrate pad and shield pad and showing the write-head pads also shunted, by the conductive epoxy of the invention.

FIG. 2b schematically shows an epoxy-treated row-bar of identical slider mounted transducers before they are cut to form individual slider mounted transducers.

DESCRIPTION OF THE PREFERRED EMBODIMENTS

Figure 3:
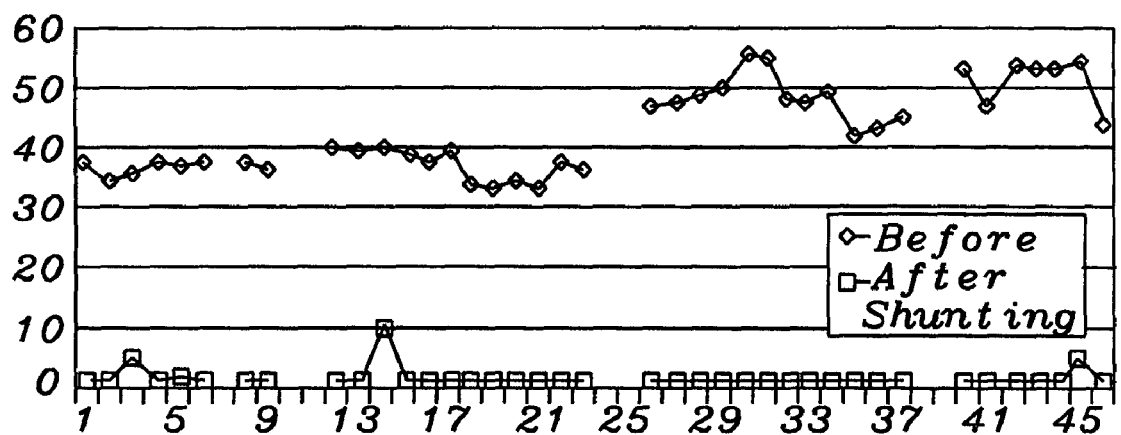
FIG. 3 is a graph showing the efficacy of the epoxy ball as a shunting mechanism when used in the shunting process.

The preferred embodiments of the present invention provides a simple method of protecting a transducer, including a GMR read-head, an inductive write-head, and surrounding shields, from electrostatic discharge (ESD) events during disk-drive fabrication by depositing an easily removable ball(s) of conductive epoxy (or other conductive thermoplastic resin) which shunts the connecting terminal pads of the sensor to the substrate of the slider on which it is mounted or that shunts the pads to surrounding shields.

Referring now to FIG. 2a, there is shown an overhead schematic view of a trailing edge surface of a slider (surface (15) of FIG. 1), showing the overcoat surface (15), the two write-head terminal pads internally connected to the write-head (50 ), the two read-head terminal pads internally connected to the read-head (60), a pad (65) providing an internal connection to the sensor shields ((8) and (10) in FIG. 1) and a pad (67) providing an internal connection to the slider substrate ((20) in FIG. 1). The sensor is shown in dashed outline (80) because it is beneath the figure plane. In accord with the method of the invention, a ball of conducting epoxy has been formed conductively contacting both read-head pads and the shield pad and thereby shunting the two read-head pads to the shield pad (70), another ball has been formed conductively contacting one read-head pad and the substrate connecting pad and thereby shunting the read-head pads to the substrate connecting pad (72) and a ball of conducting epoxy has been formed conductively contacting each of the write-head conducting pads thereby conductively connecting the write head conducting pads (74). These balls quickly and effectively electrically connect the pads to each other, to the shield pad and to the slider substrate beneath them, so that any electrostatic charge that might accumulate on the read-head sensor or its shields or on the write-head is immediately routed to the slider substrate where it dissipates harmlessly to ground. Depending upon the configuration of the transducer, there may not be a connection to the shields, in which case the read-head conducting pads would only be shunted to the substrate.

FIG. 2b schematically shows an earlier stage in the manufacturing process wherein a row-bar is sliced from a wafer having (at the present time) an approximately 6 inch diameter. It is well known in the art that a plurality of identical, alumina-encapsulated and overcoated transducers are formed on a common wafer substrate and that the wafer substrate, when sliced, forms individual slider substrates beneath each encapsulated transducer. The figure shows the wafer (10), a row-bar slice taken along a chord of the wafer (12) and, in a circled enlargement (11), the layout of terminal pads along overcoated surface of the row-bar (15). For efficiency, epoxy balls can be placed on the pads while the sliders are still in the row-bar format, just before the bars are lapped and sliced to form individual slider-mounted transducers. The epoxy balls can be placed on the pads using an auto-dispensing unit. The dispensed size depends upon pad spacing. In the present application, which should be considered only as an example, a ball of silver epoxy, approximately 100 microns in diameter, was sufficient to cover both pads as shown in the figure. The shunting can also be done using a gold epoxy, if there is concern over migration of silver into gold terminal pads during annealing processes. Subsequent to application of the epoxy, the sliced bars can be cured in a conventional oven for approximately 15 minutes at approximately 120° C., to insure proper curing of the epoxy and venting of the solvents therein. The optimal time at which to apply the epoxy could depend on the particular process flow of the fabrication. The row-bars can then be lapped. After ESD is no longer a problem in the processing, the epoxy balls can be easily removed by placing the row-bars in a cleaning tank and using conventional solvents such as acetone or heated CM10 (a commercially available solvent), together with the application of ultrasonic energy. This method was found to remove the epoxy with no damage to the pads or residual epoxy remaining on the pads. It is noted that the epoxy balls can be removed at any stage of the manufacturing process and reformed at a later stage, or they may be allowed to remain during several stages. The ease of forming and removing the epoxy balls and the fact that they leave no residue is a major advantage of the method.

For purposes of testing the efficacy of the method, row-bar mounted sliders were treated with manually applied silver epoxy immediately before surface lapping. Both before and after the shunting process, the sliders were tested with an ohmmeter to measure pad-to-pad magnetoresistive resistance (MRR) of the read-head sensor to insure that a proper shunting to the slider substrate had been obtained. Referring to FIG. 3, there is shown a graph of sensor MMR in ohms (y-axis) before and after the shunting process, as a function of the number of sliders on the row bar (x-axis). The zero resistance after shunting indicates that the sensors have been effectively shunted by the process.

Shunted and non-shunted sliders were then subjected to normal lapping and, after removal of the epoxy from the treated sliders, both sets of sliders were tested (quasistatic testing (QST)) for their magnetic performance, using such benchmarks as their hysteresis curves and maximum (peak-to-peak) output amplitudes. Signs of ESD include reduction in peak-to-peak amplitude and degradation of the hysteresis curves (including changes in shape and flipping of shape direction).

The data obtained from the two sets of sliders, particularly the spread in MRR values measured after the shunts were removed, indicates that many more of the non-shunted sliders displayed performance degradation than did the shunted sliders. This is a clear indication that both product yield and long term disk-drive reliability will be significantly improved by the shunting process. It is also to be stressed that these results were obtained after only the lapping process. It is to be reasonably expected that an even greater improvement in yield will be obtained when the shunting continues in effect throughout the entire process of fabrication, because many of the other process steps also produce static charge accumulation and discharge.

As is understood by a person skilled in the art, the preferred embodiments of the present invention are illustrative of the present invention rather than limiting of the present invention. Revisions and modifications may be made to methods, materials, structures and dimensions employed in the present method for protecting a GMR read head from electrostatic discharge (ESD) damage during manufacturing processes, while still providing a method for protecting a GMR read head from electrostatic discharge (ESD) damage during manufacturing processes, in accord with the spirit and scope of the present invention as defined by the appended claims.

What is claimed is:

1. A method for preventing GMR read heads from electrostatic discharge (ESD) damage during manufacturing processes comprising:

providing a row-bar of substantially identical slider mounted transducers, each said transducer being formed on a slider substrate and each said transducer being encapsulated in an overcoating dielectric medium and each said transducer including a GMR read-head, an inductive write-head and protective shields disposed about said read-head and said overcoating encapsulating medium having a surface on which are formed conducting terminal pads including read-head pads providing internal connections to said read-head, write-head pads providing connections to said write-head and a substrate pad providing connection to said substrate;

forming balls of electrically conducting thermoplastic resin on said read-head and write-head terminal pads and on said substrate pad, said balls forming conducting paths between said read-head pads, between said read-head pads and said substrate pad and between said write-head pads;

curing said balls at a curing temperature for a curing time;

lapping said row-bar;

slicing said row-bar to form individual slider mounted transducers.

2. The method of claim 1 further comprising the removal of said balls of electrically conducting thermoplastic resin.

3. The method of claim 2 wherein said balls of electrically conducting thermoplastic resin are removed by a solvent.

4. The method of claim 2 wherein said balls of electrically conducting thermoplastic resin are removed using a solvent and ultrasonic energy.

5. he method of claim 1 wherein said balls of electrically conducting thermoplastic resin are allowed to remain on said slider mounted transducers and said slider mounted transducers are mounted within a head-gimbals assembly.

6. The method of claim 1 wherein on said encapsulating surface there is also included a shield pad that provides an internal connection to said shields and wherein said balls also form conducting paths between said read-head pads, said substrate pad and said shield pad.

7. The method of claim 1 wherein the electrically conducting thermoplastic resin is epoxy containing gold or silver particles.

8. The method of claim 1 wherein said curing temperature is approximately 120° C. and said curing time is approximately 15 minutes.

* * * * *